United States Patent
Ochner et al.

(10) Patent No.: US 10,414,458 B2
(45) Date of Patent: Sep. 17, 2019

(54) SINGLE-TRACK SCOOTER

(71) Applicant: Bayerische Motoren Werke Aktiengesellschaft, Munich (DE)

(72) Inventors: Udo Ochner, Haimhausen (DE); Robert Bobinger, Huegelshart (DE); Fabian Bachmann, Munich (DE); Ernst Gruenwald, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 250 days.

(21) Appl. No.: 15/355,249

(22) Filed: Nov. 18, 2016

(65) Prior Publication Data
US 2017/0066496 A1 Mar. 9, 2017

Related U.S. Application Data

(63) Continuation of application No. PCT/EP2015/059759, filed on May 5, 2015.

(30) Foreign Application Priority Data

May 21, 2014 (DE) .................. 10 2014 209 686

(51) Int. Cl.
*B62K 15/00* (2006.01)
*B62K 3/00* (2006.01)
(Continued)

(52) U.S. Cl.
CPC ............ *B62K 15/008* (2013.01); *B62K 3/002* (2013.01); *B62K 21/02* (2013.01); *B62K 21/16* (2013.01);
(Continued)

(58) Field of Classification Search
CPC ...... B62K 15/008; B62K 21/02; B62K 21/16; B62K 21/18; B62K 3/002; B62K 2206/00;
(Continued)

(56) References Cited

U.S. PATENT DOCUMENTS 4,634,138 A * 1/1987 Fryer .................. B62K 15/008
280/278
5,836,602 A * 11/1998 Wang .................. B62K 15/008
280/287
(Continued)

FOREIGN PATENT DOCUMENTS

CN 201193072 Y 2/2009
CN 101973339 A 2/2011
(Continued)

OTHER PUBLICATIONS

International Search Report (PCT/ISA/210) issued in PCT Application No. PCT/EP2015/059759 dated Jul. 3, 2015, with English translation (six (6) pages).
(Continued)

*Primary Examiner* — Paul N Dickson
*Assistant Examiner* — Timothy Wilhelm
(74) *Attorney, Agent, or Firm* — Crowell & Moring LLP

(57) ABSTRACT

A single-track scooter for transporting people is provided. The scooter includes a front wheel and a rear wheel (arranged one behind the other in the longitudinal direction of the scooter, a fork for holding and guiding the front wheel, a rear wheel mount and a frame formed in three parts. The frame includes a fork mount, a middle part and a rear wheel mount. The fork mount can rotate relative to the middle part about a first axis of rotation and the rear wheel mount can rotate relative to the middle part about a second axis of
(Continued)

rotation, with the axes of rotation being arranged at an acute angle to the longitudinal axis of the scooter.

11 Claims, 3 Drawing Sheets

(51) Int. Cl.
    *B62K 21/02*     (2006.01)
    *B62K 21/16*     (2006.01)
    *B62K 21/18*     (2006.01)
    *B62M 7/12*     (2006.01)

(52) U.S. Cl.
    CPC ............... *B62K 21/18* (2013.01); *B62M 7/12* (2013.01); *B60Y 2200/126* (2013.01); *B60Y 2400/112* (2013.01); *B62K 2015/001* (2013.01); *B62K 2202/00* (2013.01); *B62K 2206/00* (2013.01)

(58) Field of Classification Search
    CPC ......... B62K 2015/001; B62K 2202/00; B62M 7/12; B60Y 2400/112; B60Y 2200/126
    See application file for complete search history.

(56) References Cited

U.S. PATENT DOCUMENTS

| | | | | |
|---|---|---|---|---|
| 5,954,349 A * | 9/1999 | Rutzel | ............... | B62K 21/00 280/100 |
| 6,619,678 B2 * | 9/2003 | van Ardenne | ........... | B62H 1/04 280/287 |
| 6,641,159 B1 * | 11/2003 | Fan | ............... | B62K 15/008 280/261 |
| 6,880,848 B2 * | 4/2005 | Liu | ............... | B62K 15/008 280/278 |
| 6,979,013 B2 * | 12/2005 | Chen | ............... | B62K 15/008 280/278 |
| 7,651,109 B2 * | 1/2010 | Tong | ............... | B62K 15/008 280/278 |
| 8,430,414 B1 * | 4/2013 | Yap | ............... | B62K 15/008 280/278 |
| 8,720,918 B2 * | 5/2014 | Liao | ............... | B62K 15/006 280/287 |
| 8,801,009 B2 * | 8/2014 | Sapir | ............... | B62K 15/008 280/87.05 |
| 8,814,194 B2 * | 8/2014 | Kim | ............... | B62K 15/008 280/278 |
| 8,894,084 B1 * | 11/2014 | Yap | ............... | B62K 15/008 280/278 |
| 9,187,144 B2 * | 11/2015 | Yap | ............... | B62K 3/002 |
| 9,643,680 B2 * | 5/2017 | Bang | ............... | B62K 3/002 |
| 9,708,025 B2 * | 7/2017 | Lee | ............... | B62K 11/02 |
| 10,024,357 B1 * | 7/2018 | Juhas | ............... | B62K 15/008 |
| 2006/0175797 A1 * | 8/2006 | Sanders | ............... | B62K 15/006 280/287 |
| 2007/0210556 A1 * | 9/2007 | Hon | ............... | B62K 15/008 280/287 |
| 2014/0008882 A1 | 1/2014 | Liao | | |
| 2015/0061248 A1 | 3/2015 | Bang | | |
| 2017/0066496 A1 * | 3/2017 | Ochner | ............... | B62K 3/002 |

FOREIGN PATENT DOCUMENTS

| | | |
|---|---|---|
| CN | 203078680 U | 7/2013 |
| DE | 298 07 616 U1 | 8/1998 |
| DE | 298 15 162 U1 | 1/1999 |
| DE | 100 52 822 A1 | 5/2002 |
| DE | 200 22 864 U1 | 8/2002 |
| DE | 20 2010 003 077 U1 | 11/2010 |
| DE | 10 2010 027 997 A1 | 3/2011 |
| DE | 2011 109 835 U1 | 5/2012 |
| EP | 2 338 773 A1 | 6/2011 |
| EP | 2 444 308 A1 | 4/2012 |
| EP | 2 338 773 B1 | 11/2013 |
| KR | 10-1207922 | 12/2012 |
| WO | WO 99/02290 A1 | 1/1999 |
| WO | WO 2010/140143 A1 | 12/2010 |
| WO | WO 2012/037798 A1 | 3/2012 |

OTHER PUBLICATIONS

German-language Written Opinion (PCT/ISA/237) issued in PCT Application No. PCT/EP2015/059759 dated Jul. 3, 2015 (six (6) pages).

German Search Report issued in counterpart German Application No. 10 2014 209 686.3 dated Apr. 27, 2015, with partial English translation (eleven (11) pages).

Chinese-language Office Action issued in counterpart Chinese Application No. 201580009717.5 dated Feb. 7, 2018 with English translation (12 pages).

\* cited by examiner

SINGLE-TRACK SCOOTER

CROSS REFERENCE TO RELATED APPLICATIONS

This application is a continuation of PCT International Application No. PCT/EP2015/059759, filed May 5, 2015, which claims priority under 35 U.S.C. § 119 from German Patent Application No. 10 2014 209 686.3, filed May 21, 2014, the entire disclosures of which are herein expressly incorporated by reference.

BACKGROUND AND SUMMARY OF THE INVENTION

The present invention relates to a scooter for transporting people.

In the case of current scooters on the market, there are variants for children, which are sold as classic scooters and are considered a preliminary step to a bicycle. From pedagogical aspects, children practice a sense of balance, and train their leg muscles, and learn a feel for speed, steering and braking. Such products are available in various sizes which are all driven exclusively by muscle power. Owing to their small geometrical dimensions and their folding function, said scooters can be collapsed and carried along, for example in public buildings or public local transport means.

Due to the small wheel size, these scooters are not suitable for covering relatively long travel distances. The use friendliness of said products is restricted not only by the noisy running, but also by a poor performance in rolling over obstacles.

In addition, scooters with which adults can be propelled are also known. Such scooters are known, for example, from German patent utility model document DE 20 2010 003 077 U1 and from European patent document EP 2 338 773 B1. Such scooters are relatively large because of their design and are not suitable for carrying along in the car or in public buildings. Proceeding from this prior art, it is the object of the present invention to provide a scooter which overcomes the disadvantages of the prior art. It is a particular object of the invention to provide a scooter which is distinguished by good travel properties as regards travel comfort and travel safety, and at the same time can be folded up to a particularly low packing size.

In order to achieve this object, the invention proposes a single-track scooter for transporting individuals, comprising a front wheel and a rear wheel, arranged one behind the other in the longitudinal direction of the scooter, a fork for holding and guiding the front wheel, and a frame which is formed in three parts and comprises a fork mount, a middle part and a rear wheel mount. The fork mount can be mounted rotatably here with respect to the middle part about a first axis of rotation, and the rear wheel mount can be mounted rotatably with respect to the middle part about a second axis of rotation. Furthermore, the axes of rotation can enclose an acute angle with the longitudinal axis of the scooter. By the obliquely positioned axes of rotation, the rear wheel mount with the rear wheel arranged thereon and the fork mount with the fork and front wheel arranged thereon can be folded up in such a manner that the two wheels are positioned in a space-saving manner next to each other above the middle part. As a result, particularly low dimensions can be realized in the folded-up state.

Furthermore, the axes of rotation can be oriented parallel to each other. As a result, symmetrical pivot movements of the front wheel and of the rear wheel can be realized, in which a collision of the parts movable toward one another is prevented. Furthermore, a multiplicity of identical parts can be used because of the parallel orientation of the axes of rotation.

In a departure therefrom, it is possible also for the axes of rotation not to be oriented parallel to each other. In this case, the axes of rotation enclose different acute angles with the longitudinal axis of the scooter. Each angle can lie within the range of 45° to 90°, wherein the reference values of said range specification are also included.

Furthermore, in the two embodiments, the axes of rotation can be arranged in one plane, wherein the axes of rotation both run in the same plane. This embodiment affords the advantage that the middle part of the frame can be formed particularly flat.

Furthermore, the scooter can be transferable from a state ready for use into a folded-in state and vice versa, wherein, in a folded-in state, the front wheel and the rear wheel are positioned above the middle part and a steering device is substantially arranged between the wheels. The steering device here can be formed from a handlebar which is connected to the fork via a stem. In a preferred embodiment, the handlebar is height-adjustable in order to be able to adapt the steering device to the height of different individuals. Furthermore, the handlebar or the stem can likewise be arranged foldably on the fork, as a result of which the dimensions of the scooter in the folded-up state can be additionally reduced. By positioning the steering unit between the wheels, it can be prevented in the folded-in state that the handlebar becomes caught on objects in the environment or comes into contact therewith in some other way when the collapsed scooter is being transported.

Furthermore, a locking device can be provided with which the position of the wheels is lockable in the state of the scooter ready for use and/or in the folded-in state. As a result, the rear wheel mount and the fork mount as part of the frame can be locked with one and the same locking device. The rear wheel mount and the fork mount can be locked here in the unfolded state, i.e. in the state of the scooter ready for use, and, in the collapsed state, can also be blocked by the locking device against adjustment. This affords the advantage that collapse of the scooter is prevented in the state ready for use. Analogously thereto, it is prevented that, in the folded-in state, individual elements, such as, for example, the rear wheel mount or the fork mount, unfold.

In addition, securing devices can be provided, wherein the fork mount is securable on the middle part of the frame by at least one securing device, and the rear wheel mount is securable on the middle part of the frame by at least one further securing device, when the scooter is in a state ready for use. This affords the advantage that, after release of the locking device, i.e. when the scooter is in an unfolded, but not locked state, the scooter does not drop solely because of its dead weight into an intermediate position between the collapsed state and the state ready for use. On the contrary, the scooter, although unlocked, remains in a position which corresponds to the state ready for use. By comparatively little application of force, the securing devices can be released from the securing position thereof, and the rear wheel mount and the fork mount can be folded in.

The wheels of the scooter can have a size within the range of 12" to 20". The wheel size has proven advantageous as regards roll-over performance and travel stability. The wheels of the scooter can furthermore be designed as spoked wheels and can be provided with pneumatic tires.

Furthermore, the scooter can have an electric drive in order to generate propulsion of the scooter. By use of the electric drive, the range of the scooter can be considerably increased in comparison to pure muscular operation.

Furthermore, the electric drive can comprise an electric motor which is preferably designed as a wheel hub motor and is integrated in the front wheel and/or the rear wheel. Additional mechanical driving elements, such as chains or gear stages, can therefore be dispensed with, thus resulting in an extremely low-maintenance scooter.

In addition or alternatively, the electric drive can comprise an energy accumulator, in particular an accumulator, a battery or a capacitive energy accumulator, wherein the energy accumulator can be arranged in the middle part of the frame. This affords the advantage that the relatively heavy energy accumulator is arranged relatively far down on the frame of the scooter, and therefore a very low center of gravity can be achieved.

In summary, the advantages of the present invention will be once again mentioned below. By using wheels which are larger than 12 inches, a good roll-over performance can be produced because of flat wheel ramp angles, as a result of which higher speeds can be achieved with simultaneously a high degree of comfort and good travel properties. This enables the scooter to be used unrestricted even on poor ground compositions. The feeling of safety for the rider is increased and at the same time the risk of accident is reduced. The scooter is intended for urban use, as an extension to motor vehicles which are known for conveying individuals. By means of the small dimensions in the collapsed state, the scooter can be particularly simply placed, for example, into the trunk of commercially available motor vehicles (passenger vehicles) or carried along on public local transport. By electrifying the scooter via the hub motor, the range can be increased or the effort of an operator for propelling purposes can be reduced. The scooter can therefore be used with motor assistance in order to cover relatively long distances and can also be operated with muscle power, in particular in regions in which motor-operated vehicles are not permitted, for example pedestrian zones, buildings, public local transport means, etc.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
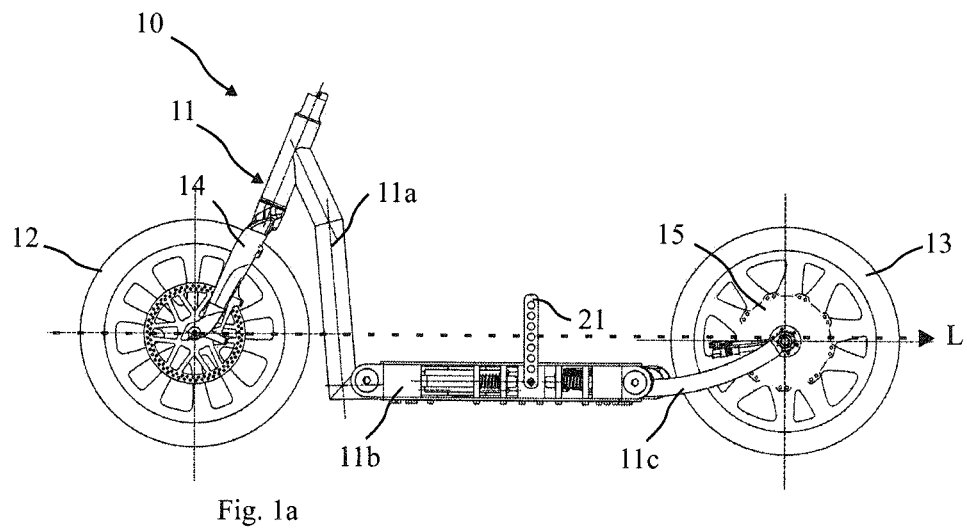
FIG. 1a shows a side view of a scooter in accordance with the present invention in the state ready for use.
Figure 1B:
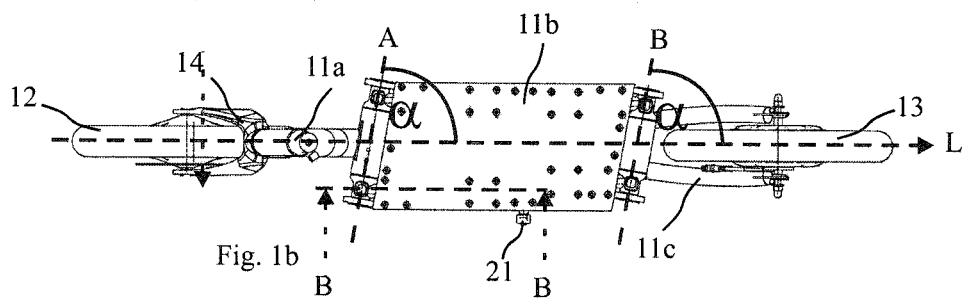
FIG. 1b shows a top view of the FIG. 1a scooter in the state ready for use.

The overall design of an embodiment of the scooter 10 of the present invention will be explained with reference to FIGS. 1a and 1b in which the scooter 10 is depicted in a state ready for use. The scooter 10 includes a frame 11, a front wheel 12, a rear wheel 13, a front wheel guide 14 and a steering unit (not illustrated). The front wheel guide 14 is designed as a fork and is mounted rotatably in a head tube and is therefore arranged on the frame 11. The front wheel 12 can rotate about a steering axis with the aid of the steering unit (not illustrated), as a result of which cornering is permitted with the scooter 10.

The frame 11 of the scooter is constructed in three parts with a fork mount 11a, a middle part 11b and a rear wheel mount 11c. The head tube is part of the fork mount 11a. The fork mount 11a is connected to the middle part 11b so as to be rotatable or pivotable about a first axis of rotation A. Analogously thereto, the rear wheel mount 11c is connected to the middle part 11b via a second axis of rotation B and is pivotable or rotatable about said axis of rotation B. The two wheels 12, 13 are arranged one behind the other in the longitudinal direction L of the scooter. The longitudinal direction I shown in FIGS. 1a and 1b points with the arrow counter to the direction of travel of the scooter, as is implemented during a forward movement. The axes of rotation A and B enclose an acute angle with the longitudinal axis L of the scooter. As is apparent in FIG. 1b, the angle at the two axes of rotation A, B is the same size, according to a first embodiment. According to a further embodiment (not illustrated), the axes of rotation A, B can also enclose different angles with the longitudinal axis L of the scooter.

Figure 2A:
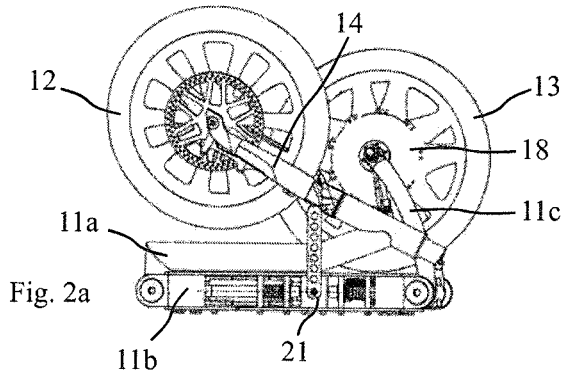
FIG. 2a shows a side view of the FIG. 1a scooter in the collapsed state.
Figure 2B:
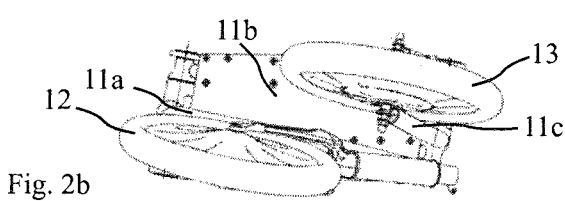
FIG. 2b shows a top view of the FIG. 1a scooter in the collapsed state.

FIGS. 2a and 2b illustrate the scooter 10 in the collapsed state. In order to transfer the scooter from a state ready for use into a collapsed state, the fork mount 11a is rotated by rotation in the clockwise direction about the first axis of rotation A such that the front wheel 12 is essentially located above the middle part 11b.

The rear wheel mount 11c with the rear wheel 13 arranged thereon is pivoted in the counter clockwise direction about the second axis of rotation B until the rear wheel 13 is arranged above the middle part 11b. As is apparent from FIG. 2b, the two wheels 12, 13 are located next to each other, above the middle part 11b, in the folded up state. The steering unit (not illustrated in the figures) is likewise fastened pivotably to the fork. With the aid of a quick-release lever, the steering unit can be released and bent down at the fork 14 above the head tube such that, in the folded up state, the steering unit is arranged above the middle part 11b between the front wheel 12 and the rear wheel 13. As is apparent from FIGS. 1a to 2b, a disk brake can be provided on the front wheel 12. A disk brake can likewise be arranged on the rear wheel 13.

In an electrically driven variant of the foldable scooter 10, an electric motor 15 is designed as a wheel hub motor in the rear wheel 13. In this case, the rear wheel may also be braked by induction, instead of by a rear disk brake. In a further alternative embodiment of the invention, the wheel hub motor 15 can also be formed in the hub of the front wheel 12.

With the aid of a lever 21, a locking device 20 can be transferred from a locked position into an unlocked position. In the unlocked position, the fork mount 11a and the rear wheel mount 11c can be pivoted about their respective axes of rotation A, B. That is to say, when the lever 21 is in an unlocked position, the scooter 10 can be transferred from a state ready for use into a collapsed state, and vice versa. In FIGS. 1a to 2b, the lever 21 is in an unlocked position. By rotation of the lever 21 into a substantially horizontal position, the locking device 20 is transferred into a locked state. As a result, the rear wheel guide 11c and the fork mount 11a are secured in the respective position, wherein the scooter 10 is locked in the respective state, i.e. in the state ready for use or in the collapsed state.

Figure 3A:
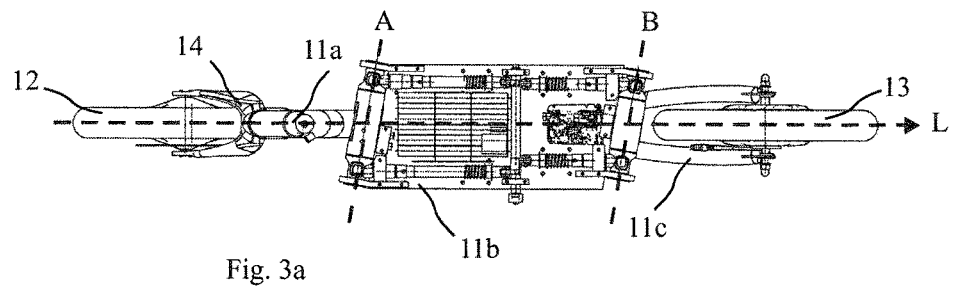
FIG. 3a shows a top view of the FIG. 1a scooter in the state ready for use, looking at the locking device.

The function of the locking device 20 will now be explained below with reference to FIGS. 3a to 3g. FIG. 3a shows a further top view of the scooter 10 in the state ready for use, wherein an upper covering of the middle part 11b has been removed. Said upper part may be designed as a cover plate 26, on which a foot board can be mounted. As an alternative thereto, the cover plate 26 itself can be configured as a foot board.

In the electrified variant of the scooter 10, the electric energy accumulator 40 can be arranged on the base plate 25. Said energy accumulator can be mounted, for example, between the locking bolts 24 for locking the fork mount 11a. A battery management system 41 can be arranged between the rear locking bolts 24 for locking the rear wheel mount 11c. The base plate 25 can also be designed as a trough in which the locking device 20, optionally together with the energy accumulator, is accommodated in a manner protected against moisture and dirt.

Figure 3B:
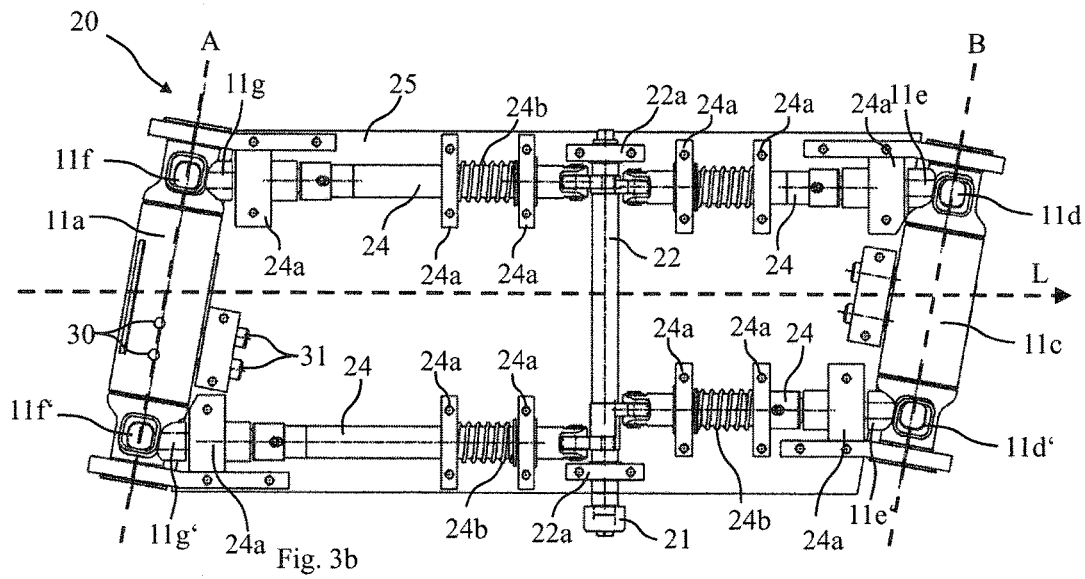
FIG. 3b shows an enlarged detailed illustration of the FIG. 3a locking device.
Figure 3C:
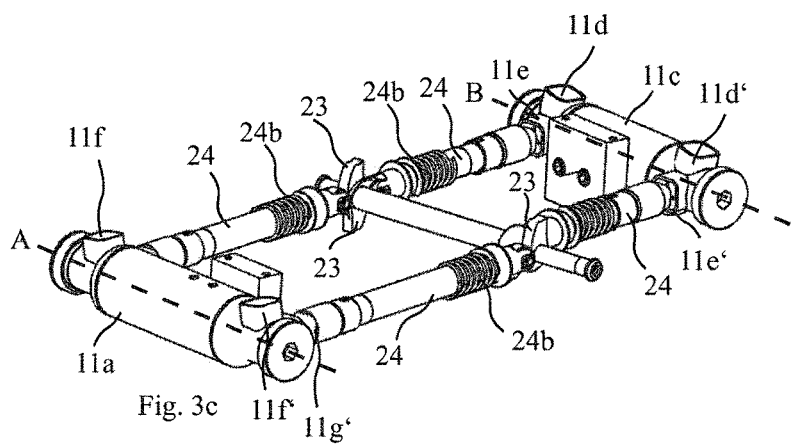
FIG. 3c shows a perspective view of the FIG. 3a locking device.

FIG. 3b shows an enlarged illustration of the locking device 20. The locking device 20 can be transferred into an unlocked position via a lever 21. Said unlocked position is illustrated in FIGS. 3a to 3f. The lever 21 is fastened non-rotatably to a shaft 22, in which four cams 23 are arranged. The cams 23 are in touching contact with locking bolts 24. By actuation of the lever 21, i.e. by rotation of the lever 21, the shaft 22 is also rotated about its longitudinal axis. The shaft 22 is mounted in bearings 22a. In order to lock the locking unit 20, the cams 23 exert a force on the locking bolts 24, which force acts in the longitudinal direction of the locking bolts 24. As a result, the locking bolts 24 are displaced in their longitudinal direction, which also corresponds to the longitudinal direction L of the scooter. Each locking bolt 24 is connected to the base plate 25 of the middle part 11b via bearings 24a. As a result, the locking bolts 24 can carry out linear movements substantially in their longitudinal direction. An end of the locking bolt 24 that faces away from the cam 23 can be brought into engagement with a corresponding mount 11g, 11g', 11f, 11f'. This mount or recess is provided in the fork mount 11a. By rotation of the fork mount 11a about the axis of rotation A, a first recess 11g, 11g' or a second recess 11f, 11f' can optionally be positioned in such a manner that the respective recess can be brought into engagement with a corresponding bolt 24. By locking of the locking bolt 24 to a recess 11g or 11g', the fork mount 11a is locked in a position in which the scooter 10 is ready for use. In a collapsed position of the fork mount 11a, the recesses 11f and 11f' are oriented, by rotation of the fork mount about the axis of rotation A, in such a manner that said recesses can be brought into engagement with the locking bolt 24. As a result, the fork mount 11a is locked in a folded-up state of the scooter 10. The locking of the rear wheel guide or of the rear wheel mount 11c also functions analogously thereto. In the engagement region, the outer shape of the locking bolts 24 and the inner shape of the recesses 11g, 11g', 11f, 11f' are formed in a corresponding manner, and therefore a good form-fitting connection can be achieved in the event of locking.

The fork mount 11a is locked via two front locking bolts 24. The rear wheel mount 11c is locked via two rear locking bolts 24—in the longitudinal direction L. In a locked position, each locking bolt is prestressed via a spring 24b, wherein the spring force presses the locking bolt 24 in the direction of the shaft 22. In other words, the pressure-loaded spring 24b has the task of pulling the respective locking bolt 24 out of the recess 11g, 11g', 11f, 11f' after the unlocking. When the locking device 20 is transferred into a locked state, the cams 23 press onto the locking bolts and therefore operate counter to the spring force 24b. By way of example and in a non-limiting manner, the spring 24b is designed as a helical spring.

Figure 3D:
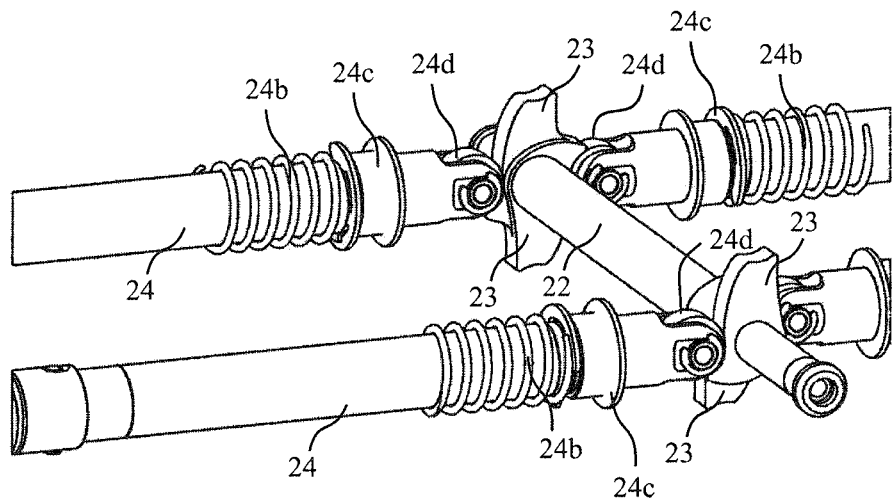
FIG. 3d shows a perspective view of a detail of the FIG. 3a locking device.

As is apparent from FIG. 3d, the cams 23 are arranged one behind the other in the longitudinal direction of the shaft 22, wherein one cam 23 is provided for actuating a front locking bolt 24 and one cam 23 is provided for actuating a rear locking bolt 24. Each locking bolt 24 has a roller 24d at that end of the locking bolt 24 which faces the cam 23. Said roller reduces the friction between locking bolt end and cam 23, as a result of which the forces for locking and unlocking the scooter 10 are reduced and the operator friendliness is increased. The spring force of each spring 24b acts in such a manner that it pulls the respective locking bolt 24 out of the recesses 11g, 11g', 11f, 11f' when the prestressing is released via the lever 21. The springs 24b are supported on the one hand against the mounting 24a, which faces the axis of rotation A, B, and on the other hand against a Seeger circlip ring 24c mounted on the locking bolt 24.

Figure 3E:
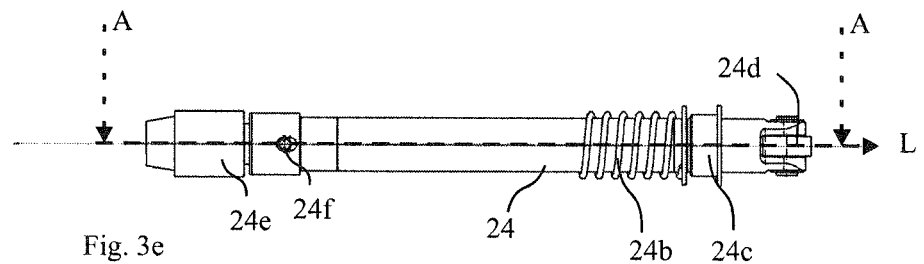
FIG. 3e shows a side view of a locking bolt of the FIG. 3a locking device.
Figure 3F:
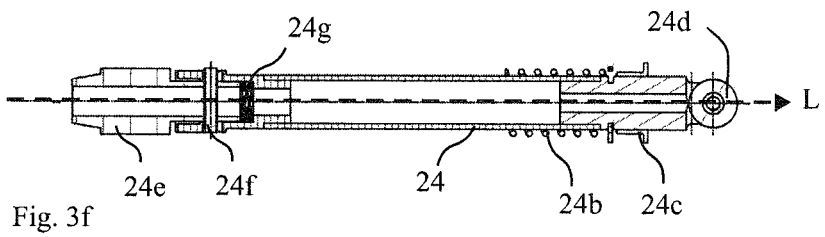
FIG. 3f shows a sectional view through the FIG. 3e locking bolt along the section line A-A.
Figure 3G:
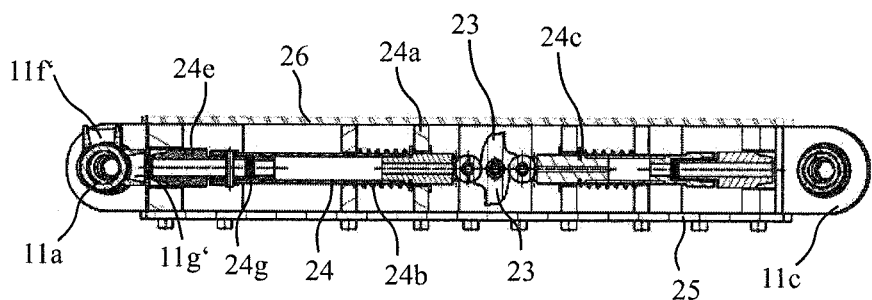
FIG. 3g shows a partial sectional view along the section line B-B in FIG. 1b.

The locking device 20 has wear compensation and tolerance compensation which will be explained below with reference to FIGS. 3e and 3g. The locking bolt 24 has a first axial end on which the roller 24d is arranged. The opposite end is an end of the bolt 24 with which said bolt can be brought into engagement with the recesses 11d, e, f, g. A cap 24e is provided at this end of the locking bolt 24, said cap being mounted displaceably in the axial direction of the locking bolt 24 and being able to be brought into engagement with the recess 11g, 11g', 11f, 11f'. The cap 24e can be displaced forward and backward in the axial direction via a guide pin 24f, wherein said cap is secured by the locking bolt 24 against release. The cap 24e is supported in relation to the basic body of the locking bolt 24 via a disk spring assembly 24g. When the fork mount 11a or the rear wheel guide 11c is locked, the cap 24e comes into touching contact with the recess 11d, e, f, g. Wear phenomena occur here due to friction, and therefore the contact point between cap 24e and recess 11g, 11g', 11f, 11f' can be shifted over the course of time. The disk spring assembly 24g ensures that the cap 24e is pushed further in the axial direction, and therefore secure locking is always ensured with the prestressing force remaining the same. The guide pin 24f slides here in a groove, the length of which limits the possible stroke for the active region of the disk spring assembly. The locking of the rear wheel mount 11c functions analogously, wherein the locking bolts 24 which are oriented rearward engage in the recesses 11e, 11e', 11d, 11d'.

The scooter 10 has a securing device for preconditioning the frame 11 before the latter is locked. The securing device will be explained with reference to FIG. 3b. Two recesses 30, illustrated in circular form here, are provided in the fork mount 11a. Said recesses are oriented in alignment with the recesses 11f and 11f'. A holder in which securing pins 31 are arranged is provided on the base plate 25. Said securing pins 31 are designed as spring pins and are suitable for latching to the recesses 30. As a result, the fork mount 11a can be secured in a position in which the bolts 24 can engage in the recesses 11*f* and 11*f'*. Structurally identical recesses 30 are oriented and provided in the fork mount 11*a* in such a manner that they can latch to the spring pins 31 when the recesses 11*g*, 11*g'* are oriented as an extension of the locking bolts 24. In FIG. 3*b*, the fork mount 11*a* is secured in the last-described position. The securing device therefore affords the advantage that, when the fork mount 11*a* pivots from a folded-up state into an unfolded state and vice versa, the fork mount 11*a* latches in discrete positions in which the locking bolts 24 can then be introduced into the corresponding recesses 11*g*, 11*g'*, 11*f*, 11*f'* in a particularly secure manner. As a result, first of all the wear at the locking bolts 24 is reduced and second of all a laborious setting of the locking position is also prevented. Not least, the securing device also affords the advantage that, when the scooter 10 is unlocked, the latter does not collapse immediately, but rather remains metastable until it is folded up or unfolded by an operator. For this purpose, the middle part 11*b* or the foot board is raised or pressed down by the operator with a small application of force. This may alternatively also take place by the operator by means of a movement of the handlebar forward or rearward. An analogous securing device is also provided on the rear wheel guide 11*c*.

LIST OF REFERENCE NUMBERS

10. Single-track scooter
11. Frame
11*a*. Fork mount
11*b*. Middle part
11*c*. Rear wheel mount
12. Front wheel
13. Rear wheel
14. Fork
15. Electric motor
20. Locking device
21. Lever
22. Shaft
23. Cam
24. Locking bolt
24*a*. Bearing
24*b*. Spring
24*c*. Spring stop/Seeger circlip ring
24*d*. Roller
24*e*. Cap
24*f*. Guide pin
24*g*. Disk spring
25. Base plate
26. Cover plate/foot board
30. Securing device
31. Securing pin
40. Energy accumulator
41. Battery management system The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A single-track scooter for transporting individuals, comprising:
a front wheel;
a rear wheel;
a fork; and
a frame,
wherein
the rear wheel is arranged behind the front wheel in the longitudinal direction of the scooter,
the fork is configured to hold and guide the front wheel, and
the frame includes a fork mount, a middle part having a horizontal surface configured to support a standing operator, and a rear wheel mount,
the fork mount is rotatable with respect to the middle part about a first axis of rotation parallel to a plane containing the horizontal surface,
the rear wheel mount is rotatable with respect to the middle part about a second axis of rotation, and
the first and second axes of rotation are at respective acute angles to a longitudinal axis of the scooter and are arranged such that when in a folded-in state the front and rear wheels are located adjacent to one another above the horizontal surface.

2. The scooter as claimed in claim 1, wherein the first and second axes of rotation are parallel.

3. The scooter as claimed in claim 1, wherein the first and second axes of rotation are co-planar.

4. The scooter as claimed in claim 1, wherein when the scooter is in the folded-in state, at least a portion of a steering device configured to turn the front wheel is positioned between lateral sides of the front and rear wheels.

5. The scooter as claimed in claim 4, further comprising:
a locking device configured to lock the front and rear wheels into respective ready use positions relative to the middle part in the ready use state and into respective folded-in positions in the folded-in position.

6. The scooter as claimed in claim 5, further comprising:
a plurality of securing elements,
wherein
at least one of the plurality of securing elements is configured to secure the fork mount relative to the middle part in the ready use state, and
another of the plurality of securing elements is configured to secure the rear wheel mount relative to the middle part in the ready use state.

7. The scooter as claimed in claim 1, wherein the front and rear wheels have a diameter of at least 12 inches.

8. The scooter as claimed in claim 7, wherein the diameter of the front and rear wheels is up to 20 inches.

9. The scooter as claimed in either of claim 8, wherein the electric drive includes an energy accumulator, the energy accumulator includes at least one of a battery and a capacitive energy accumulator, and the energy accumulator is arranged in the middle part of the frame.

10. The scooter as claimed in claim 1, further comprising: an electric drive configured to propel the scooter.

11. The scooter as claimed in claim 10, wherein the electric drive includes at least one wheel hub electric motor integrated in at least one of the front wheel and the rear wheel.

* * * * *